(12) United States Patent
Yano

(10) Patent No.: US 8,356,069 B2
(45) Date of Patent: Jan. 15, 2013

(54) COMMUNICATION APPARATUS AND STORAGE MEDIUM STORING PROGRAM

(75) Inventor: Keigo Yano, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 520 days.

(21) Appl. No.: 12/719,159

(22) Filed: Mar. 8, 2010

(65) Prior Publication Data

US 2010/0250659 A1 Sep. 30, 2010

(30) Foreign Application Priority Data

Mar. 31, 2009 (JP) ................................. 2009-086582

(51) Int. Cl.
*G06F 15/16* (2006.01)
(52) U.S. Cl. ............. 709/203; 709/224; 345/24; 345/27
(58) Field of Classification Search .......... 709/200–203, 709/224; 345/24, 27
See application file for complete search history.

(56) References Cited

U.S. PATENT DOCUMENTS

| | | | |
|---|---|---|---|
| 7,664,299 B2 * | 2/2010 | Niwa ............................ | 382/128 |
| 8,018,493 B2 * | 9/2011 | Sakaue et al. ............... | 348/207.2 |
| 2002/0126150 A1 * | 9/2002 | Parry ............................ | 345/771 |
| 2005/0219664 A1 * | 10/2005 | Niwa ............................ | 358/524 |
| 2008/0141148 A1 | 6/2008 | Ogita | |
| 2008/0147664 A1 | 6/2008 | Fujiwara et al. | |
| 2008/0165209 A1 | 7/2008 | Kondo et al. | |
| 2008/0240495 A1 * | 10/2008 | Abe et al. ..................... | 382/100 |
| 2008/0256077 A1 | 10/2008 | Kuroda | |

FOREIGN PATENT DOCUMENTS

| | | |
|---|---|---|
| JP | H11-025114 A | 1/1999 |
| JP | H11-191082 A | 7/1999 |
| JP | 2001-101064 A | 4/2001 |
| JP | 2002-259200 A | 9/2002 |
| JP | 2004-070809 A | 3/2004 |
| JP | 2006-099455 A | 4/2006 |
| JP | 2006-139614 A | 6/2006 |
| JP | 2006-268295 A | 10/2006 |
| JP | 2007-011893 A | 1/2007 |

(Continued)

OTHER PUBLICATIONS

Japan Patent Office, Decision of Refusal for Japanese Patent Application No. 2009-086582, dispatched May 31, 2011.

(Continued)

*Primary Examiner* — Moustafa M Meky
(74) *Attorney, Agent, or Firm* — Baker Botts L.L.P.

(57) ABSTRACT

A communication apparatus which obtains a content on the basis of a content URL associated with image data displayed on a display portion, including: a feed information obtaining section which obtains feed information including content informations each including a title, an image URL, and the content URL and which stores the obtained feed information into a storage device; an image data obtaining section which obtains the image data on the basis of the image URL; a display controller which displays the obtained image data in association with the content URL; an obtainment judging section which judges whether the image data has been obtained on the basis of the image URL or not, wherein the display controller displays, where the obtainment judging section has judged that the image data has not been obtained on the basis of the image URL, alternative image data in association with the content URL.

15 Claims, 8 Drawing Sheets

FOREIGN PATENT DOCUMENTS

| | | |
|---|---|---|
| JP | 2007-115137 A | 5/2007 |
| JP | 2008-040788 A | 2/2008 |
| JP | 2008-059528 A | 3/2008 |
| JP | 2008-152584 A | 7/2008 |
| JP | 2008-165692 A | 7/2008 |
| JP | 2008-167417 A | 7/2008 |
| JP | 2008-301050 A | 12/2008 |
| JP | 2008-301484 A | 12/2008 |
| WO | 2005/069153 A1 | 7/2005 |

OTHER PUBLICATIONS

Odu, Tomoyuki, "'Dirty News Reader' for Displaying a Delivery Article Title of a RSS-Capable Site in the Manner of an Electric Bulletin Board," Impress Corporation, May 26, 2004, available at http://www.forest.impress.co.jp/article/2004/05/26/dirtynewsreader.html (searched on Jul. 29, 2008). (Concise explanation/partial translation also enclosed).

Japan Patent Office, Notification of Reason for Refusal for Japanese Patent Application No. 2009-086582, dispatched Jan. 11, 2011.

Japan Patent Office, Notification of Reason for Refusal for Japanese Patent Application No. 2009-086582, dispatched Sep. 13, 2011.

"Quartz Composer Book" described by Mamoru Kano; BNN Shinsha, Oct. 1, 2008, p. 129-p. 137, First Edition, Japan.

* cited by examiner

| IDENTIFICATION NUMBER (105) | TITLE (106) | CONTENT URL (107) | IMAGE DATA (110) |
|---|---|---|---|
| 1 | A | http://rss.brother.co.jp/1 | ○.jpg |
| 3 | C | http://rss.brother.co.jp/3 | ☆.jpg |
| 5 | E | http://rss.brother.co.jp/5 | ♣.jpg |

— 37A

| IDENTIFICATION NUMBER (105) | TITLE (106) | CONTENT URL (107) | IMAGE DATA (110) |
|---|---|---|---|
| 2 | B | http://rss.brother.co.jp/2 | |
| 4 | D | http://rss.brother.co.jp/4 | |

COMMUNICATION APPARATUS AND STORAGE MEDIUM STORING PROGRAM

CROSS REFERENCE TO RELATED APPLICATION

The present application claims priority from Japanese Patent Application No. 2009-086582, which was filed on Mar. 31, 2009, the disclosure of which is herein incorporated by reference in its entirety.

BACKGROUND OF THE INVENTION

1. Field of the Invention

The present invention relates to a communication apparatus relating to content information and a storage medium storing a program.

2. Description of the Related Art

Various contents are published on a network. There is a server on which is published feed information including a plurality of content informations each including a URL of each content and a title of the content. A format of the feed information includes RSS (Resource Description Framework Site Summary) and Atom, for example. In the conventional technique, there is a software for obtaining the feed information and displaying a title of each content. Where this software is installed on a PC, a user can browse or view the title of each content. Where the user has selected one of the titles, the PC obtains the content on the basis of the content URL included in the content information with the selected title and then displays the content.

SUMMARY OF THE INVENTION

The content information may include a URL of image data (hereinafter may be referred to as an "image URL") in addition to the URL of the content and the title of the content. When displaying the content information included in the obtained feed information, the communication apparatus obtains the image data on the basis of the image URL included in the content information and displays the obtained image data. When the user has selected the displayed image data, a communication apparatus obtains the content on the basis of the content URL included in the content information with the image URL corresponding to the displayed image data and displays the obtained content. However, there is a case in which the image data cannot be obtained although the image URL is included in the content information. In this case, the image data cannot be displayed, whereby the content cannot be obtained by the selection of the image data by the user.

This invention has been developed in view of the above-described situations, and it is an object of the present invention to provide a communication apparatus and a storage medium storing a program which eliminate the above-described inconvenience.

The object indicated above may be achieved according to the present invention which provides a communication apparatus which obtains a content on the basis of a content URL associated with image data displayed on a display portion where the image data has been selected, the communication apparatus comprising: a feed information obtaining section configured to obtain, from a server device, feed information including a plurality of content informations each including a title of the content, an image URL indicating positional information of the image data, and the content URL indicating positional information of the content and configured to store the obtained feed information into a storage device; an image data obtaining section configured to obtain the image data on the basis of the image URL included in the feed information obtained by the feed information obtaining section; a display controller configured to display the image data obtained on the basis of the image URL on the display portion in association with the content URL included in the content information including the image URL; an obtainment judging section configured to judge whether the image data has been obtained on the basis of the image URL by the image data obtaining section or not, wherein the display controller is configured to display, where the obtainment judging section has judged that the image data has not been obtained on the basis of the image URL, alternative image data instead of the image data on the display portion in association with the content URL included in the content information including the image URL.

The object indicated above may be achieved according to the present invention which provides a storage medium storing a program executed by a communication apparatus which obtains a content on the basis of a content URL associated with image data displayed on a display portion where the image data has been selected, the program comprising: obtaining, from a server device, feed information including a plurality of content informations each including the title of the content, an image URL indicating positional information of the image data associated with the title, and a content URL indicating positional information of the content and storing the obtained feed information into a storage device; obtaining the image data on the basis of the image URL included in the obtained feed information; displaying the obtained image data on the display portion in association with the content URL included in the content information including the image URL; judging whether the image data has been obtained on the basis of the image URL or not; and displaying, where the image data has not been obtained on the basis of the image URL, alternative image data instead of the image data on the display portion in association with the content URL included in the content information including the image URL.

BRIEF DESCRIPTION OF THE DRAWINGS

The objects, features, advantages, and technical and industrial significance of the present invention will be better understood by reading the following detailed description of an embodiment of the invention, when considered in connection with the accompanying drawings, in which.

DESCRIPTION OF THE EMBODIMENT

Hereinafter, there will be described an embodiment of the present invention by reference to the drawings.

There will be explained a configuration of a communication system 2 with reference to FIG. 1. The communication system 2 includes a communication apparatus 10, a PC 70, and a plurality of content distribution servers (i.e., server devices) 90, 91. The communication apparatus 10 is connected to a LAN line 4. Likewise, the PC 70 is connected to the LAN line 4. The LAN line 4 is connected to an internet 8 via a router 6. Each of the content distribution servers 90, 91 is connected to the internet 8.

Figure 1:
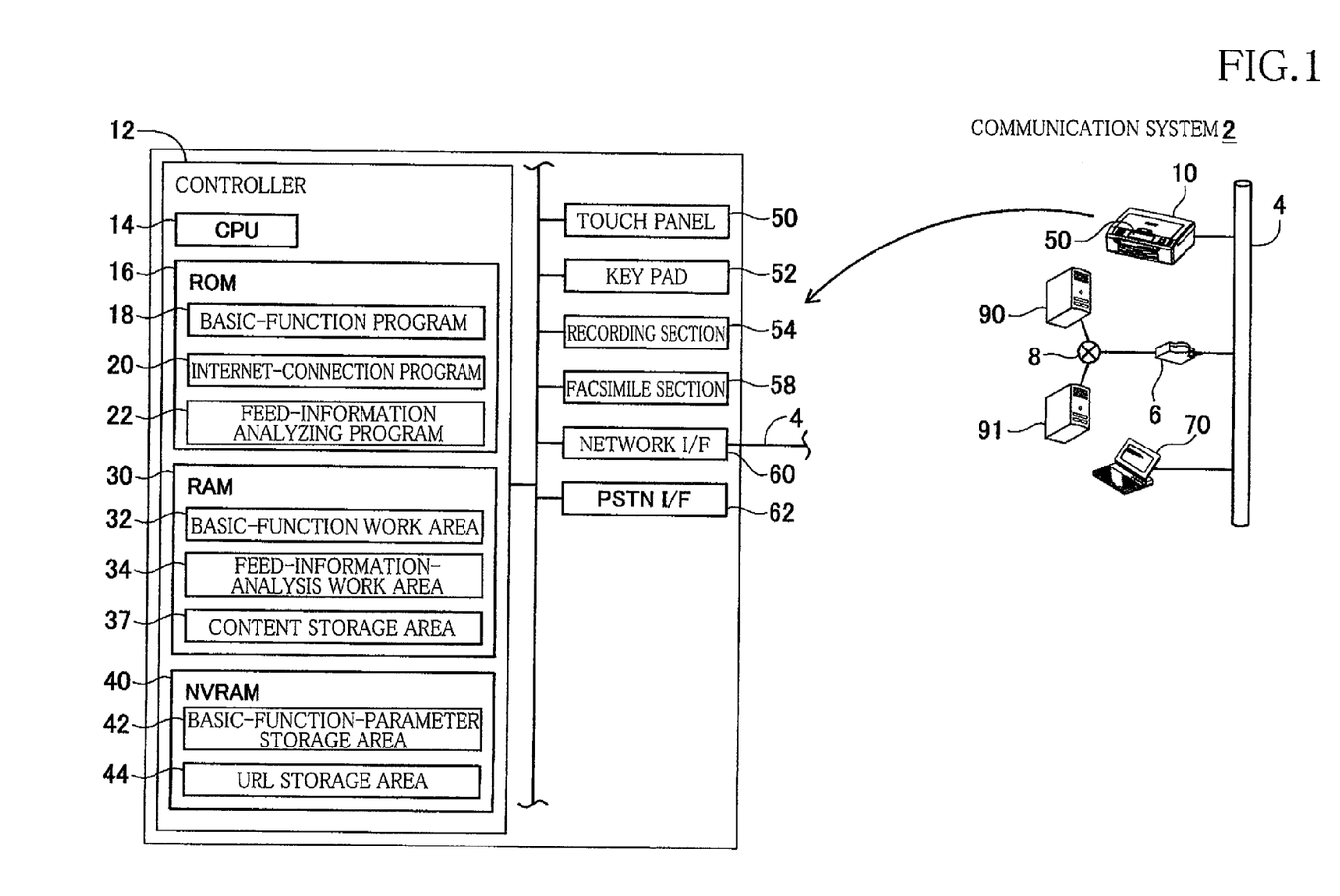
FIG. 1 is a schematic view of a communication system.

Although not shown in FIG. 1, the content distribution server 90 stores feed information 101 (feed information in RSS format). Further, the feed information 101 is widely published to a plurality of users. Here, there will be explained the feed information 101 with reference to FIG. 2. It is noted that the feed information 101 is information described or expressed in RSS (RDF Site Summary) format, e.g., RSS 1.0, RSS 2.0, and Atom.

Figure 2:
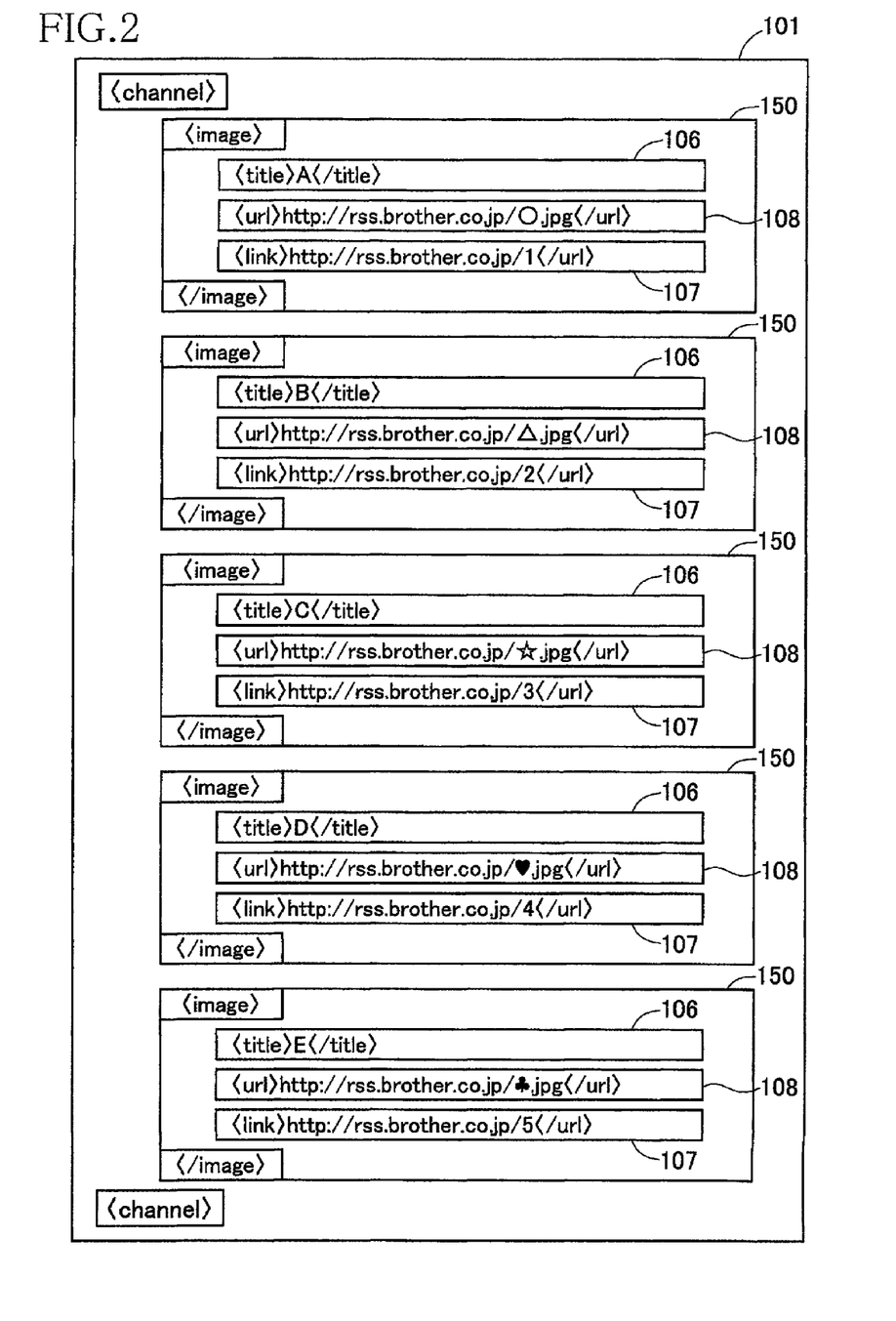
FIG. 2 is an example of feed information.

The feed information 101 includes a plurality of content informations 150. Further, each of the content informations 150 includes (a) a title 106 of a content to which the content information 150 is linked (hereinafter may be simply referred to as a "title 106"), (b) a URL 107 of the content which indicates positional information of the content and to which the content information 150 is linked (hereinafter may be simply referred to as a "content URL 107"), and (c) a URL 108 of image data which indicates positional information of the image data and to which the content information 150 is linked (hereinafter may be simply referred to as an "image URL 108").

Although not shown, the content distribution server 91 shown in FIG. 1 includes (a) the content specified by each of the content URLs 107 and (b) image data 110 specified by each of the image URLs 108. Hereinafter, there will be explained this communication apparatus 2 in a configuration in which the content distribution server 90 includes the feed information 101 while the content distribution server 91 includes the contents and the image data 110, but this configuration is merely an example. For example, the image data 110 and the contents may be respectively stored in different servers. Further, the contents and the feed information 101 may be stored in the same server. Furthermore, the image data 110 and the feed information 101 may be stored in the same server.

The explanation of the feed information 101 will be continued with reference to FIG. 2 again. To the feed information 101 are attached tags for identifying various informations included in the feed information 101. Tags for specifying the feed information 101 are "<channel>" and "</channel>". Tags for specifying the content information 150 are "<image>" and "</image>". Tags are constituted as a pair. A character string between "<image>" and "</image>" is a content of the content information 150. The tags allow a CPU 14 to identify what type of information each information of the feed information is.

Tags for specifying the title 106 are "<title>" and "</title>". A character "A" between "<title>" and "</title>" is a content of the title 106. Tags for specifying the content URL 107 are "<link>" and "</link>". A character string "http://rss.brother.co.jp/1" between "<link>" and "</link>" is a content of the content URL 107. Tags for specifying the image URL 108 are "<url>" and "</url>". A character string "http://rss.brother.co.jpo.jpg" is a content of the image URL 108.

The explanation of the communication system 2 will be continued with reference to FIG. 1 again. The communication apparatus 10 includes a controller 12, a touch panel (i.e., a display portion) 50, key pads 52, a recording section 54, a facsimile section 58, a network interface 60, a PSTN interface 62, and so on. The controller 12 includes the CPU 14, a ROM 16, a RAM 30, a NVRAM 40, and so on.

The CPU 14 performs or executes various processings in accordance with various programs stored in the ROM 16. A basic-function program 18 is a program for controlling basic operations of the communication apparatus 10. The basic-function program 18 includes, e.g., programs for producing display data based on which characters and images are displayed on the touch panel 50. Further, the basic-function program 18 includes, e.g., programs for controlling the recording section 54, the facsimile section 58, and so on. An Internet-connection program 20 is a program for making a connection with the internet 8. A feed-information analyzing program 22 is a program for analyzing the feed information 101 obtained from the content distribution server 90 and performing a processing based on the tags.

The NVRAM 40 includes a basic-function-parameter storage area 42 and a URL storage area 44. The basic-function-parameter storage area 42 is a storage area for storing various parameters (e.g., a recording setting, a facsimile setting, initial values of a plurality of functions of the communication apparatus 10, and so on) used when the CPU 14 performs the processing in accordance with the basic-function program 18. The URL storage area 44 is a storage area for storing site URLs each of which is information for specifying the content distribution server 90 storing the feed information 101. For example, a user needs to store the site URL into the URL storage area 44 with the key pads 52 or the like in order to obtain the feed information 101 from the content distribution server 90.

The network interface 60 is connected to the LAN line 4. The communication apparatus 10 can communicate with the PC 70 and access the internet 8.

The RAM 30 includes a basic-function work area 32, a feed-information-analysis work area 34, and the content storage area 37. The basic-function work area 32 is a storage area for storing various data produced in course of performance of the processing in accordance with the basic-function program 18. The feed-information-analysis work area 34 is a storage area for storing various data produced in course of performance of the processing in accordance with the feed-information analyzing program 22. The content storage area 37 is a storage area for storing various data produced as a result of the processing according to the feed-information analyzing program 22.

Figure 3:
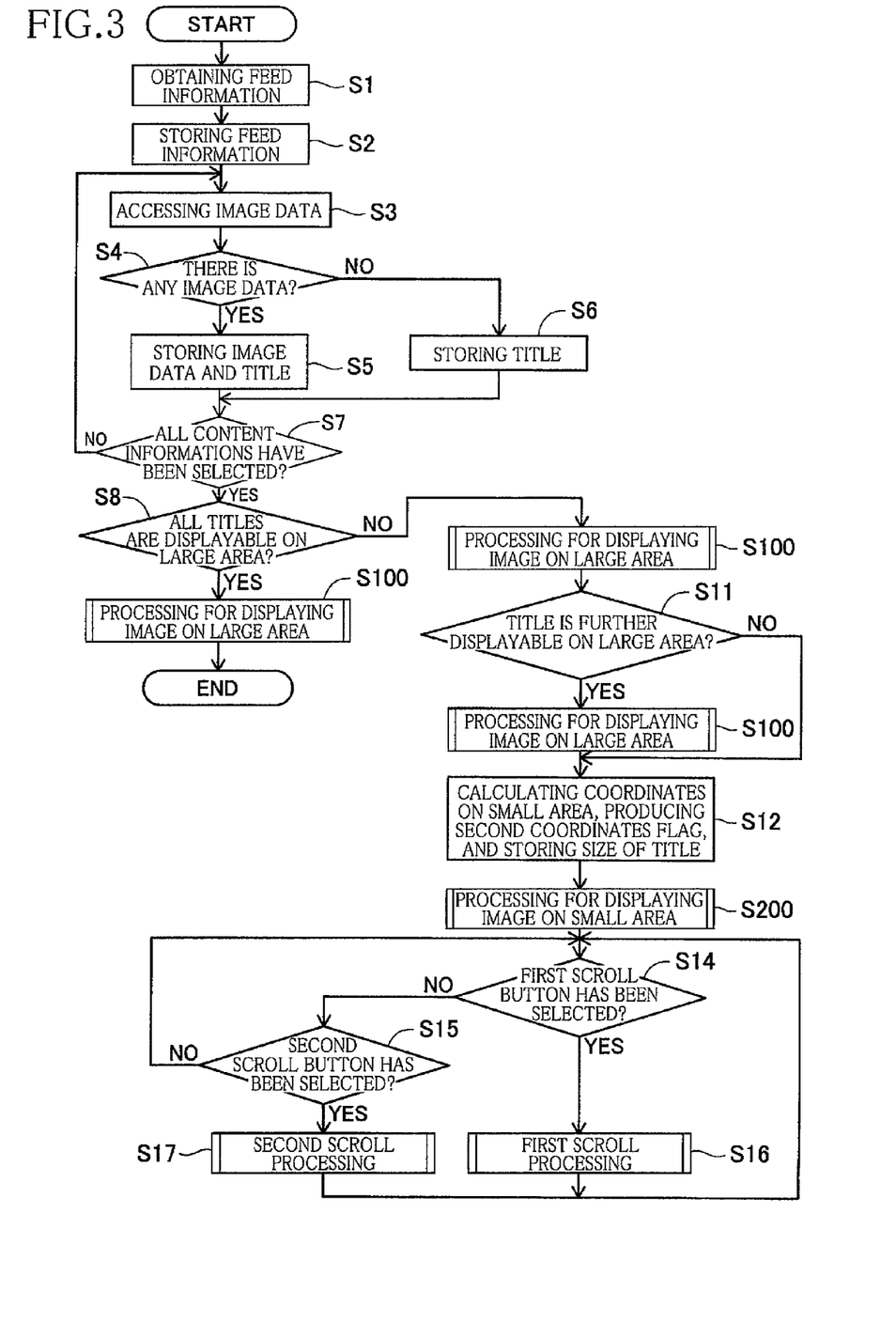
FIG. 3 is a flow-chart showing a main operation of a communication apparatus.

There will be explained a main operation of the communication apparatus 10 with reference to FIG. 3. A processing of the main processing is started when the user has inputted a command using the key pads 52, for example.

In S1, the CPU 14 selects one of the site URLs stored in the URL storage area 44 and obtains the feed information 101 from one server specified by the selected site URL. In the present embodiment, the site URLs are stored in the URL storage area 44 in advance. Here, the CPU 14 obtains the feed information 101 from the content distribution server 90.

In S2, the CPU 14 deletes all informations stored in the feed-information-analysis work area 34 and the content storage area 37. Among the informations stored in the feed-information-analysis work area 34 and the content storage area 37 are the feed information stored in the feed-information-analysis work area 34 in the past and so on. Then, the CPU 14 stores the feed information 101 obtained from the content distribution server 90 into the feed-information-analysis work area 34.

In S3, the CPU 14 selects one of the content informations 150 which is included in the feed information 101 stored in the feed-information-analysis work area 34 and which has not been selected yet. In a script program like RSS, the processing is performed in a predetermined direction (e.g., in a direction from the upper side toward the lower side where FIG. 2 is visually seen). Thus, in this explanation, the CPU 14 selects one of the content informations 150 which has not been selected yet, in order from the upper side where FIG. 2 is visually seen.

After selecting the one content information 150, the CPU 14 accesses a position in which the image data 110 stored in the content distribution server 91 is likely to be stored, on the basis of the image URL 108 of the one content informations 150.

In S4, the CPU 14 judges whether the CPU 14 has obtained the image data 110 from the position in which the image data 110 is likely to be stored or not. Where the CPU 14 has judged that the CPU 14 has obtained the image data 110 (S4: YES), the processing goes to S5. Where the CPU 14 has judged that the CPU 14 has not obtained the image data 110 (S4: NO), the processing goes to S6. It is noted that the case in which the CPU 14 has judged that the CPU 14 has not obtained the image data 110 includes the case in which the image data 110 does not exist in the position of the content distribution server 91 which is based on the image URL 108, and the case in which the CPU 14 cannot communicate with the content distribution server 91.

Figure 4:
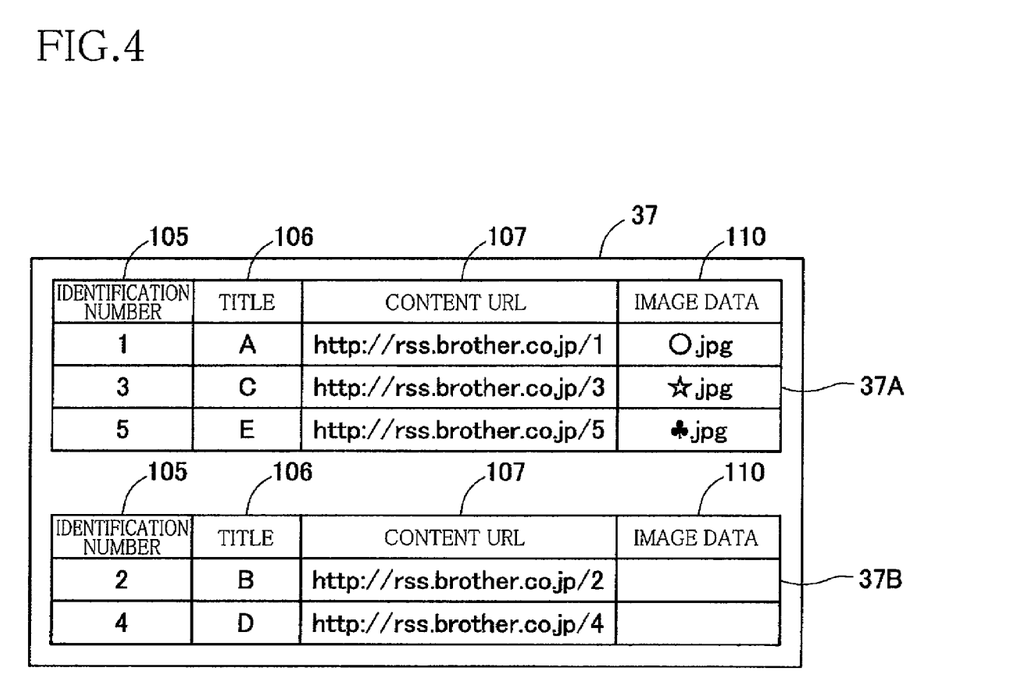
FIG. 4 is a conceptual view of various data stored in a content storage area.

In S5, the CPU 14 stores the image data 110 obtained in S4 into a storage area 37A of the content storage area 37 together with the title 106 and the content URL 107 of the content information 150 including the image URL 108 which specifies the position in which the image data 110 is stored. In this time, the CPU 14 attaches, to the title 106 to be stored, an identification number 105 which is the number representing the order of the content information 150 selected in S3. In performing the processings of S3-S7, the CPU 14 selects the title 106 from the upper side. Thus, the number of the identification number 105 attached to the title 106 selected in S3 represents what number from the uppermost side of the script program as the feed information 101 the number of the title 106 is (with reference to FIGS. 2 and 4).

In S6, the CPU 14 stores, into a storage area 37B of the content storage area 37, the title 106 and the content URL 107 of the content information 150 including the image URL 108 which specifies the position in which the image data 110 having not been obtained is stored. In this time, the CPU 14 attaches, to the title 106 to be stored, the identification number 105 which is the number representing the order of the content information 150 selected in S3. In performing the processings of S3-S7, the CPU 14 selects the title 106 from the upper side. Thus, the number of the identification number 105 attached to the title 106 selected in S3 represents what number from the uppermost side of the script program as the feed information 101 the number of the title 106 is (with reference to FIGS. 2 and 4).

In S7, the CPU 14 judges whether the CPU 14 has selected all the content informations 150 in S3 or not. As described above, in the script program like RSS, the processing is performed in the predetermined direction (e.g., in the direction from the upper side toward the lower side where FIG. 2 is visually seen). Thus, where the CPU 14 has judged that the CPU 14 has selected all the content informations 150 included in the feed information 101 in order from the upper side, the CPU 14 refers the tag "</channel>". As a result, all the content informations 150 are considered to be selected. Where the CPU 14 has judged that all the content informations 150 have been selected (S7: YES), the processing goes to S8. Where the CPU 14 has judged that all the content informations 150 have not been selected (S7: NO), the processing goes to S3.

In S8, the CPU 14 compares the number of the titles 106 stored in the content storage area 37 and the number of the titles 106 which can be displayed on a large area (i.e., a large display area). Here, the large area is a part of display area displayed on the touch panel 50. In this communication apparatus 10, the number of the titles which can be displayed on the large area is set in advance. Further, a size of each title 106 displayed on the large area (i.e., a display size of each title 106 on the large area) is the same. This is the same also in the display size and coordinates of the title 106 displayed on the large area in processings S107, S108, and S109 which will be described below. It is noted that the display size of each title 106 displayed on the large area may be hereinafter referred to as a "large predetermined size". This is the same also in the image data 110 and alternative image data displayed on the large area. The alternative image data will be explained in detail below.

Where the CPU 14 has judged that the number of the titles 106 stored in the content storage area 37 is equal to or smaller than the predetermined number of the titles 106 which can be displayed on the large area (S8: YES), in other words, where all the titles 106 stored in the content storage area 37 can be displayed on the large area, a processing of S100 is performed for the titles 106 stored in the content storage area 37 and information relating to the titles 106.

Where the CPU 14 has judged that the number of the titles 106 stored in the content storage area 37 is larger than the predetermined number of the titles 106 which can be displayed on the large area (S8: NO), in other words, where all the titles 106 stored in the content storage area 37 cannot be displayed on the large area, the processing of S100 is performed for the titles 106 stored in the storage area 37A and information relating to the titles 106. It is noted that, although not shown in FIG. 3, where the CPU 14 has judged that no title 106 is stored in the storage area 37A, the processing goes to S12.

Figure 9A:
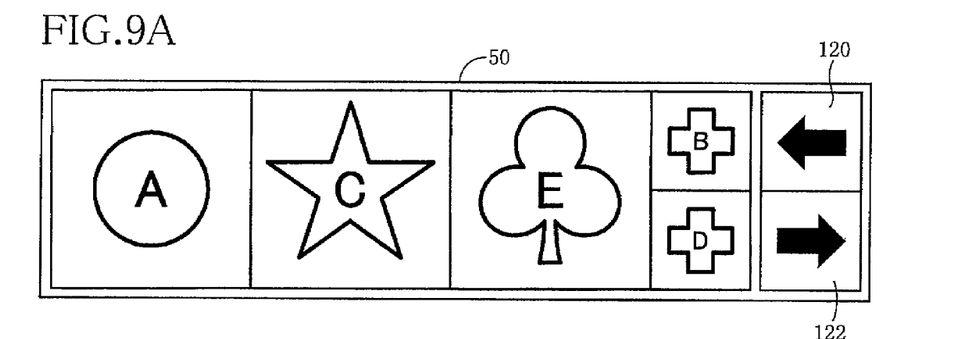
FIGS. 9A-9C are conceptual views each for showing a display on a touch panel in the scroll processings.
Figure 9B:
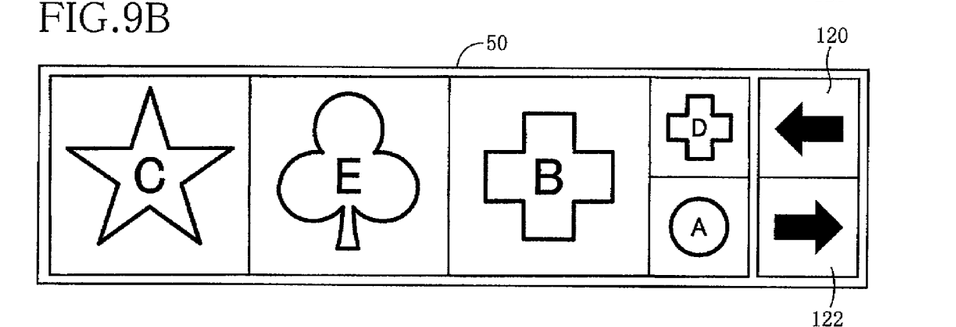
Figure 9C:
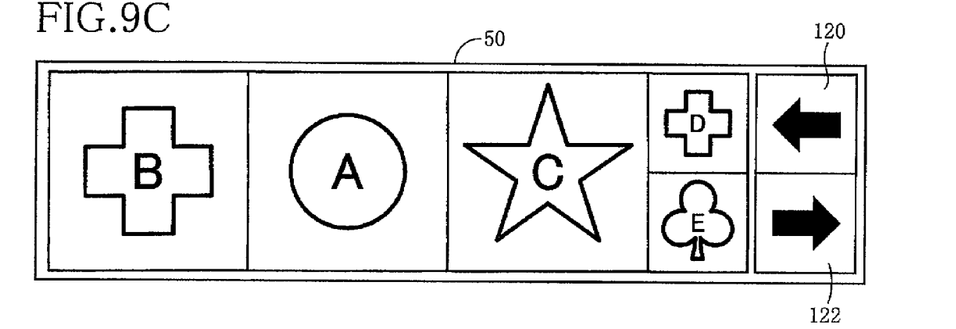

It is noted that, a term "first coordinates flag" will be used in the present embodiment. The first coordinates flag is coordinates information representing a position in which, when one title 106 is displayed on the large area, the title 106 is to be displayed. The number of the titles 106 which can be displayed on the large area and the number of the first coordinates flags are the same as each other. Further, a number is assigned to each first coordinates flag (e.g., a number-one first coordinates flag, a number-two first coordinates flag, and so on). Where the number of the titles 106 which can be displayed on the large area is three, the number of the first coordinates flag is three. That is, there are three first coordinates flags, namely, the number-one first coordinates flag, the number-two first coordinates flag, and a number-three first coordinates flag. In the present embodiment, the number of the first coordinates flags is set in advance. Further, although not shown, the first coordinates flag is stored in advance in the basic-function-parameter storage area 42. Further, there are set in advance on which coordinates each title 106 is displayed on the large area in accordance with the number of a corresponding one of the first coordinates flags. As shown in FIG. 9, a leftmost large rectangular frame (i.e., a leftmost image display area) corresponds to the number-one first coordinates flag. A middle large rectangular frame (i.e., a middle image display area) corresponds to the number-two first coordinates flag. A rightmost large rectangular frame (i.e., a rightmost image display area) corresponds to the number-three first coordinates flag.

Figure 5:
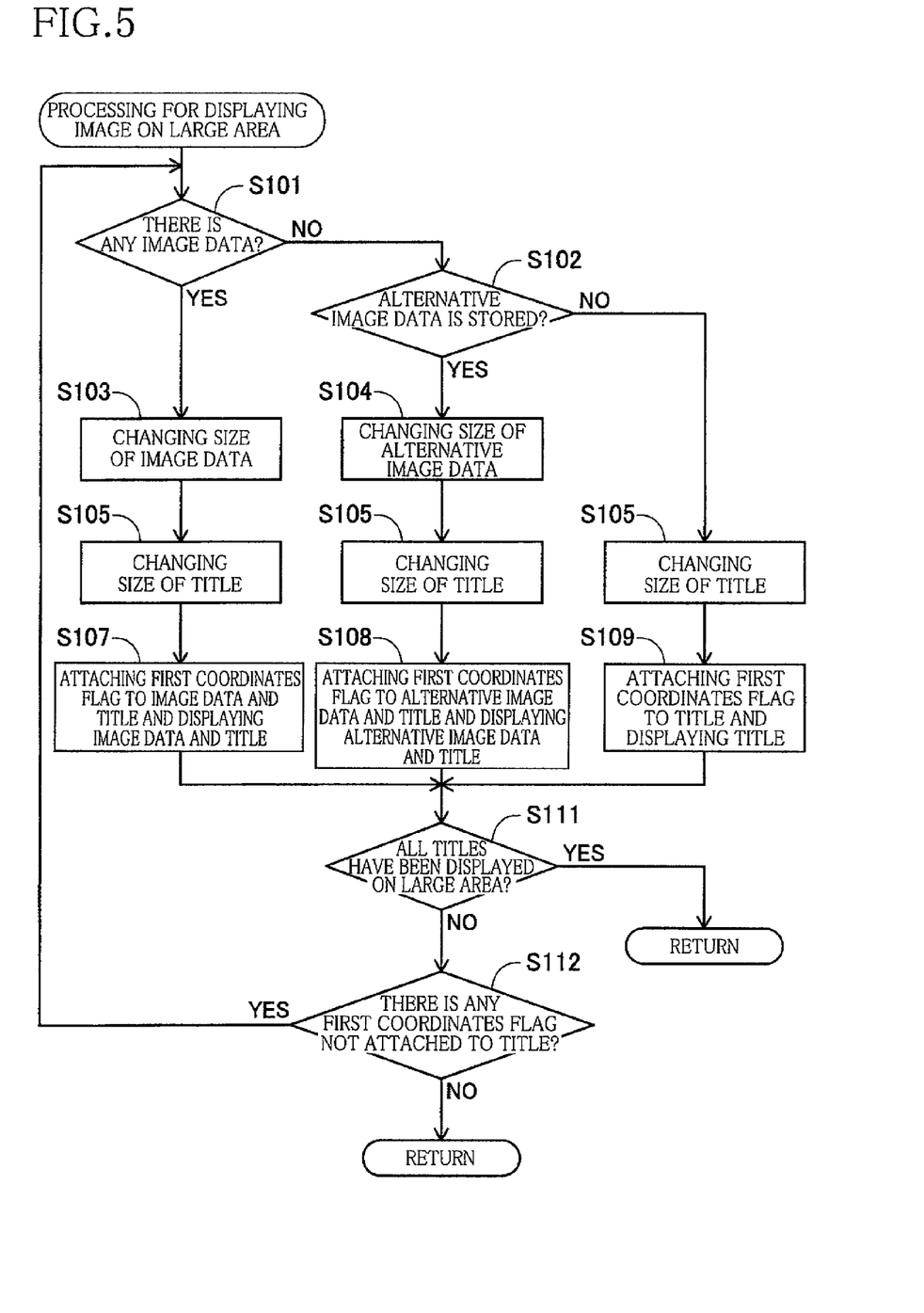
FIG. 5 is a flow-chart showing a processing for displaying an image on a large area.

There will be explained the processing of S100 with reference to FIG. 5.

In S101, the CPU 14 selects one of the titles 106 to which any of the first coordinates flag and a second coordinates flag is not attached and to which the smallest identification number 105 is attached. However, where there is any title 106 to which a priority flag, the CPU 14 selects the title 106 to which the priority flag is attached. Then, the CPU 14 refers and judges whether the image data 110 is stored together with the selected title 106 or not. Where the CPU 14 has judged that the image data 110 is stored together with the selected title 106 (S101: YES), the processing goes to S103. Where the CPU 14 has judged that the image data 110 is not stored together with the selected title 106 (S101: NO), the processing goes to S102. It is noted that in the case where the CPU 14 has made a negative decision ("NO") in S8, when the processing of S100 is performed in a state in which there is any title 106 in the storage area 37A, the CPU 14 makes an affirmative decision ("YES") in S101 for all the titles 106 selected by the CPU 14. This is because the processing of S100 after the CPU 14 has made the negative decision ("NO") in S8 is performed only for the storage area 37A, and, in this case, each of all the titles 106 includes the image data 110. However, since there is a case in which the CPU 14 makes the negative decision "NO" in S101 in the processing of S100 after making the affirmative decision "YES" in S8, an explanation of this case will be given here. It is noted that any of the second coordinates flag and the priority flag is not used in the processing of S100 after the CPU 14 has made an affirmative decision ("YES") in S8. The second coordinates flag is used in the processings S100 after a processing of S12. The priority flag is used in the processing of S100 in processings of S16 and S17. Thus, the second coordinates flag and the priority flag will be described in detail below.

There will be explained a flow in a case where the CPU 14 has made the affirmative decision ("YES") in S101 in the processing of S100 after the CPU 14 has made an affirmative decision ("YES") in S8. In S103, the CPU 14 replicates or reproduces the image data 110 stored with the title 106 referred in S101 and stores the newly-produced image data 110 into the basic-function work area 32. Then, the CPU 14 changes a size of the newly-produced image data 110 to the large predetermined size. In S105, the CPU 14 replicates or reproduces the title 106 referred in S101 and stores the newly-produced title 106 into the basic-function work area 32. Then, the CPU 14 changes a size of the newly-produced title 106 to the large predetermined size.

In S107, the CPU 14 attaches, to each of the image data 110 whose size has been changed to the large predetermined size in S103 and the title 106 whose size has been changed to the large predetermined size in S105, one of the first coordinates flags which is stored in the basic-function-parameter storage area 42, which is not attached to any of the titles 106 stored in the content storage area 37, and which has the smallest number. Then, the CPU 14 displays the title 106 and the image data 110 on the large area on the basis of the first coordinates flag attached thereto. The title 106 and the image data 110 are displayed on the same coordinates and thus displayed on the touch panel 50 so as to overlap with each other. In this time, the CPU 14 displays the title 106 and the image data 110 on the large area in association with the content URL 107 stored with the title 106 and the image data 110. Here, the term "in association with" or "associated with" means a state in which, when the user has selected the title 106 or the image data 110 displayed on the touch panel 50, the user can access the content specified by the content URL 107 on the basis of the content URL 107 associated with the title 106 or the image data 110.

There will be explained a flow in a case where the CPU 14 has made the negative decision ("NO") in S101. There is the case in which the CPU 14 has made the negative decision ("NO") in S101 since the processing of S100 after the CPU 14 has made an affirmative decision ("YES") in S8 is performed for the content storage area 37. Where the CPU 14 has made the negative decision ("NO") in S101, the CPU 14 judges in S102 whether the alternative image data is stored in the basic-function-parameter storage area 42 or not. The alternative image data is image information which is stored by the user in advance into the basic-function-parameter storage area 42 and which is based on template image data which is a template displayable on the touch panel 50. The user can store the alternative image data into the basic-function-parameter storage area 42 using the key pads 52. Where the CPU 14 has judged that the alternative image data is stored in the basic-function-parameter storage area 42 (S102: YES), the processing goes to S104. Where the CPU 14 has judged that the alternative image data is not stored in the basic-function-parameter storage area 42 (S102: NO), the processing goes to S105.

Hereinafter, there will be explained a flow in a case where the CPU 14 has made an affirmative decision ("YES") in S102. In S104, the CPU 14 replicates or reproduces the alternative image data and stores the newly-produced alternative image data into the basic-function work area 32. Then, the CPU 14 changes a size of the newly-produced alternative image data to the large predetermined size. In S105, the CPU 14 replicates or reproduces the title 106 referred in S101 and stores the newly-produced title 106 into the basic-function work area 32. Then, the CPU 14 changes a size of the newly-produced title 106 to the large predetermined size.

In S108, the CPU 14 attaches, to each of the alternative image data whose size has been changed to the large predetermined size in S104 and the title 106 whose size has been changed to the large predetermined size in S105, one of the first coordinates flags which is stored in the basic-function-parameter storage area 42, which is not attached to any of the titles 106 and the image data 110 stored in the content storage area 37, and which has the smallest number. Then, the CPU 14 displays the title 106 and the alternative image data on the large area on the basis of the first coordinates flag attached thereto. The title 106 and alternative image data are displayed on the same coordinates and thus displayed on the touch panel 50 so as to overlap with each other. In this time, the CPU 14 displays the title 106 and the alternative image data on the large area in association with the content URL 107 stored with the title 106 and the alternative image data.

There will be explained a flow in a case where the CPU 14 has made a negative decision ("NO") in S102. In S105, the CPU 14 replicates or reproduces the title 106 referred in S101 and stores the newly-produced title 106 into the basic-function work area 32. Then, the CPU 14 changes a size of the newly-produced title 106 to the large predetermined size. Then, in S109, the CPU 14 attaches, to the title 106 whose size has been changed to the large predetermined size in S105, one of the first coordinates flags which is stored in the basic-function-parameter storage area 42, which is not attached to any of the titles 106 stored in the content storage area 37, and which has the smallest number. Then, the CPU 14 displays the title 106 on the large area on the basis of the first coordinates flag attached thereto. In this time, the CPU 14 displays the title 106 on the large area in association with the content URL 107 stored with the title 106.

After performing one of the processings of S107, S108, and S109, the CPU 14 judges in S111 whether the first coordinates flag is attached to each of all the titles 106 stored in the content storage area 37 or not. Where the CPU 14 has judged that the first coordinates flag is attached to each of all the titles 106 (S111: YES), the processing of S100 is completed. Here, the case in which the CPU 14 has made an affirmative decision ("YES") in S111 is a case in which all the titles 106 included in the feed information 101 have been displayed on the large area, for example. Where the CPU 14 has judged that the first coordinates flag is not attached to each of all the titles 106 (S111: NO), the processing goes to S112.

In S112, the CPU 14 judges whether there is any first coordinates flag not attached to the title 106 or not. Where the CPU 14 has judged that there is any first coordinates flag not attached to the title 106 (S112: YES), the processing goes to S101. Where the CPU 14 has judged that there is no first coordinates flag not attached to the title 106 (S112: NO), the processing of S100 is completed. Here, the case in which the CPU 14 has made a negative decision ("NO") in S112 is a case in which the title 106 cannot be displayed on the large area any more. In the present embodiment, since the number of the first coordinates flags is set to three, the case in which the CPU 14 has made the negative decision ("NO") in S112 is a case in which each of all the three first coordinates flags to each of which the number is assigned has been attached to the corresponding title 106.

The explanation of the processing of S100 is finished, and the explanation of the main processing is continued with reference to FIG. 3 again. After the CPU 14 has judged that the number of the titles 106 stored in the content storage area 37 is larger than the predetermined number of the titles 106 which can be displayed on the large area (S8: NO), and has performed the processing of S100, the CPU 14 judges in S11 whether the title 106 can be displayed on the large area any more or not. A criterion of this judgment is whether all the first coordinates flags stored in the basic-function-parameter storage area 42 are stored in the content storage area 37 or not. Where all the first coordinates flags stored in the basic-function-parameter storage area 42 are stored in the content storage area 37, the CPU 14 judges that other titles 106 cannot be displayed on the large area any more (S11: NO), and the processing goes to S12. Where all the first coordinates flags stored in the basic-function-parameter storage area 42 are not stored in the content storage area 37, the CPU 14 judges that the title 106 can be further displayed on the large area (S11: YES). Then, the CPU 14 performs the processing of S100 for the title(s) 106 stored in the content storage area 37 and information relating thereto, and the processing goes to S12.

Here, there will be explained the processing of S100 after this processing of S11. In this processing of S100, the CPU 14 performs the processing for the title 106 stored in the content storage area 37 and information relating thereto. The first coordinates flag has already been attached to each title 106 stored in the storage area 37A in the processing of S100 before the processing of S11. Thus, in S101 in this processing of S100, the CPU 14 makes the judgment for the title 106 to which the smallest identification number 105 is attached among the titles 106 stored in the storage area 37B, and attaches the first coordinates flag on the basis of this judgment. As a result, it becomes possible for the CPU 14 to display the alternative image data and the title 106 not having the image data 110 on the large area in association with each other (in S108). As described above, the CPU 14 performs the processing of S100 before the processing of S11 only for the storage area 37A, which makes it possible to display the title 106 having the image data 110 on the large area with a higher priority. Further, after displaying the title 106 having the image data 110 on the large area, the CPU 14 displays the title 106 not having the image data 110 on the large area in S100 after the processing of S11, thereby avoiding a case in which nothing is displayed on the large area.

In S12, the CPU 14 calculates the number of the titles 106 each of which is stored in the content storage area 37 and to each of which the first coordinates flag is not attached. In other words, the CPU 14 calculates the number of the titles 106 each of which is stored in the content storage area 37 and is not displayed on the large area. Then, the CPU 14 calculates a display size of each title 106 to be displayed on a small area (i.e., a small display area). Here, the small area is a part of the display area displayed on the touch panel 50 and disposed at a position different from a position at which the large area is disposed. Further, a display area of the small area is set in advance so as to be smaller than the display size of each title 106 displayed on the large area. A size of each title 106 displayed on the small area (i.e., a display size of each title 106 on the small area) is obtained by dividing a predetermined display area of the small area by the number of the titles 106 each of which is stored in the content storage area 37 and to each of which the first coordinates flag is not attached. More specifically, the size of each title 106 displayed on the small area is obtained by fixing a size of the display area of the small area along a horizontal axis thereof and by dividing a size of the display area of the small area along a vertical axis thereof by the number of the titles 106 to each of which the first coordinates flag is not attached. It is noted that the display size of each title 106 displayed on the small area may be hereinafter referred to as a "small predetermined size". This is the same also in the image data 110 and the alternative image data.

In this time, the second coordinates flag(s) whose number is the same as that of the titles 106 displayed on the small area is or are produced and stored into the basic-function work area 32. The second coordinates flag is coordinates information representing a position in which, when one title 106 is displayed on the small area, the title 106 is to be displayed. Further, a number is assigned to each second coordinates flag like the first coordinates flag. Further, there are set in advance on which coordinates each title 106 is displayed on the small area in accordance with the number of a corresponding one of the first coordinates flags. As shown in FIG. 9, an upper small rectangular frame (i.e., an upper image display area) in a rightmost frame shown in FIGS. 9A, 9B, and 9C corresponds to a number-one second coordinates flag. A lower small rectangular frame (i.e., a lower image display area) in the rightmost frame corresponds to a number-two second coordinates flag.

After performing the processing of 812, the CPU 14 performs a processing of S200 for the title(s) 106 stored in the content storage area 37 and information relating thereto. Hereinafter, there will be described the processing of S200 with reference to FIG. 6.

Figure 6:
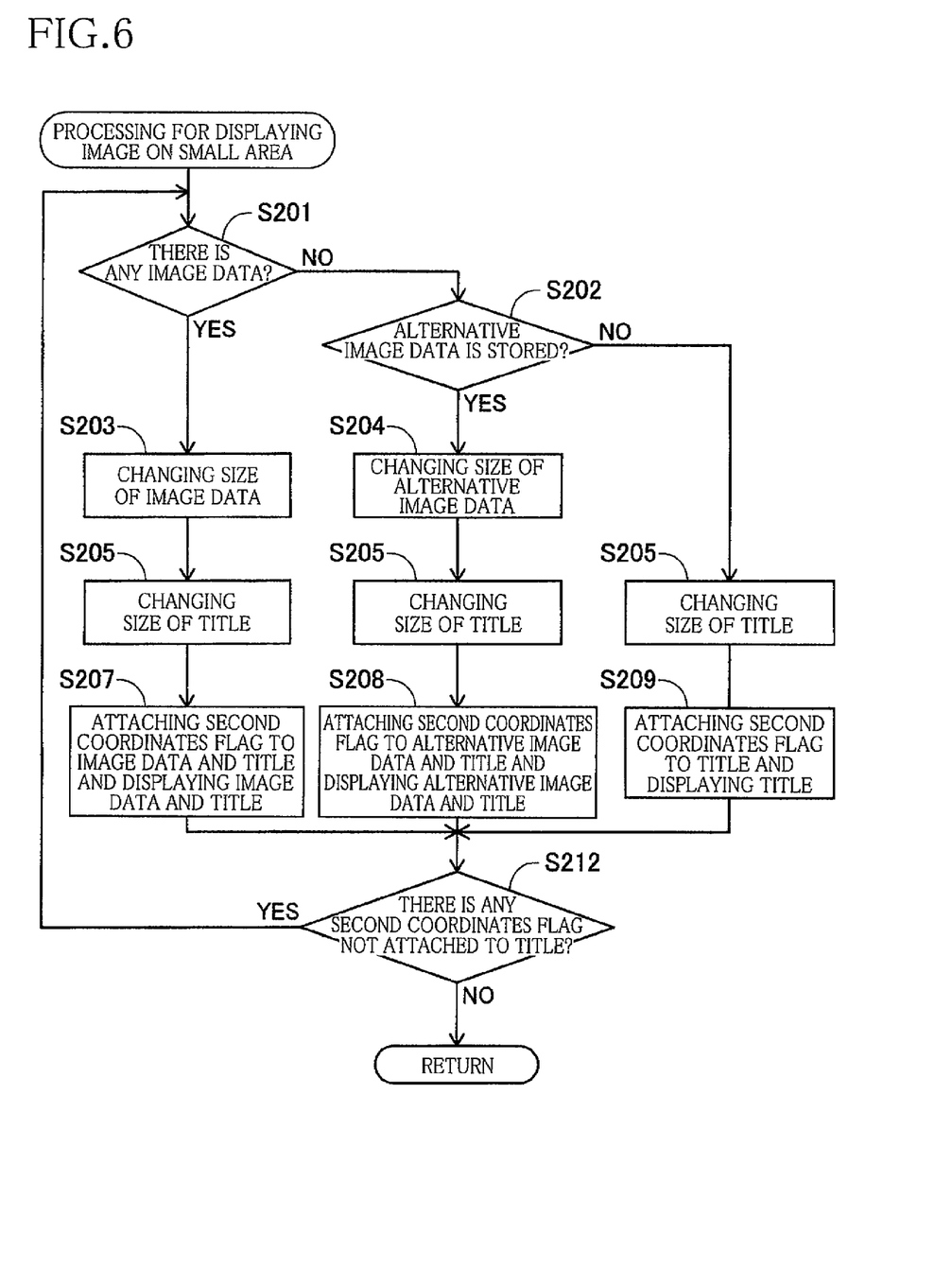
FIG. 6 is a flow-chart showing a processing for displaying an image on a small area.

In S201, the CPU 14 selects one of the titles 106 to which any of the first coordinates flag and the second coordinates flag is not attached and which has the smallest identification number 105. Then, the CPU 14 refers and judges whether the image data 110 is stored together with the selected title 106 or not. Where the CPU 14 has judged that the image data 110 is stored together with the selected title 106 (S201: YES), the processing goes to S203. Where the CPU 14 has judged that the image data 110 is not stored together with the selected title 106 (S201: NO), the processing goes to S202.

There will be explained a flow in a case where the CPU 14 has made an affirmative decision ("YES") in S201. In S203, the CPU 14 replicates or reproduces the image data 110 stored with the title 106 referred in S201 and stores the newly-produced image data 110 into the basic-function work area 32. Then, the CPU 14 changes a size of the newly-produced image data 110 to the small predetermined size. In S205, the CPU 14 replicates or reproduces the title 106 referred in S201 and stores the newly-produced title 106 into the basic-function work area 32. Then, the CPU 14 changes a size of the newly-produced title 106 to the small predetermined size.

In S207, the CPU 14 attaches, to each of the image data 110 whose size has been changed to the small predetermined size in S203 and the title 106 whose size has been changed to the small predetermined size in S205, one of the second coordinates flags which is stored in the basic-function work area 32, which is not attached to any of the titles 106 stored in the content storage area 37, and which has the smallest number. Then, the CPU 14 displays the title 106 and the image data 110 on the small area on the basis of the second coordinates flag attached thereto. The title 106 and the image data 110 are displayed on the same coordinates and thus displayed on the touch panel 50 so as to overlap with each other. In this time, the CPU 14 displays the title 106 and the image data 110 on the small area in association with the content URL 107 stored with the title 106 and the image data 110.

There will be explained a flow in a case where the CPU 14 has made a negative decision ("NO") in S201. Where the CPU 14 has made the negative decision ("NO") in S201, the CPU 14 judges in S202 whether the alternative image data is stored in the basic-function-parameter storage area 42 or not. Where the CPU 14 has judged that the alternative image data is stored in the basic-function-parameter storage area 42 (S202: YES), the processing goes to S204. Where the CPU 14 has judged that the alternative image data is not stored in the basic-function-parameter storage area 42 (S202: NO), the processing goes to S205.

Hereinafter, there will be explained a flow in a case where the CPU 14 has made an affirmative decision ("YES") in S202. In S204, the CPU 14 replicates or reproduces the alternative image data and stores the newly-produced alternative image data into the basic-function work area 32. Then, the CPU 14 changes a size of the newly-produced alternative image data to the small predetermined size. In S205, the CPU 14 replicates or reproduces the title 106 referred in S201 and stores the newly-produced title 106 into the basic-function work area 32. Then, the CPU 14 changes a size of the newly-produced title 106 to the small predetermined size.

In S208, the CPU 14 attaches, to each of the alternative image data whose size has been changed to the small predetermined size in S204 and the title 106 whose size has been changed to the small predetermined size in S205, one of the second coordinates flags which is stored in the basic-function work area 32, which is not attached to any of the titles 106 stored in the content storage area 37, and which has the smallest number. Then, the CPU 14 displays the title 106 and the alternative image data on the small area on the basis of the second coordinates flag attached thereto. The title 106 and alternative image data are displayed on the same coordinates and thus displayed on the touch panel 50 so as to overlap with each other. In this time, the CPU 14 displays the title 106 and the alternative image data on the small area in association with the content URL 107 stored with the title 106 and the alternative image data.

There will be explained a flow in a case where the CPU 14 has made a negative decision ("NO") in S202. In S205, the CPU 14 replicates or reproduces the title 106 referred in S201 and stores the newly-produced title 106 into the basic-function work area 32. Then, the CPU 14 changes a size of the newly-produced title 106 to the small predetermined size. Then, in S209, the CPU 14 attaches, to the title 106 whose size has been changed to the small predetermined size in S205, one of the second coordinates flags which is stored in the basic-function work area 32, which is not attached to any of the titles 106 stored in the content storage area 37, and which has the smallest number. Then, the CPU 14 displays the title 106 on the small area on the basis of the second coordinates flag attached thereto. In this time, the CPU 14 displays the title 106 on the small area in association with the content URL 107 stored with the title 106.

After performing one of the processings of S207, S208, and S209, the CPU 14 judges in S212 whether there is any second coordinates flag not attached to the title 106 or not. Where the CPU 14 has judged that there is any second coordinates flag not attached to the title 106 (S212: YES), the processing goes to S201. Where the CPU 14 has judged that there is no second coordinates flag not attached to the title 106 (S212: NO), the processing of S200 is completed. Here, the case in which the CPU 14 has made a negative decision ("NO") in S212 is a case in which all the titles 106 have been displayed on the small area.

The explanation of the processing of S200 is finished, and the explanation of the main processing is continued with reference to FIG. 3 again.

In S14, the CPU 14 judges whether the user has pressed a first scroll button 120 or not. The first scroll button 120 is a button for scrolling the title(s) 106 displayed on the touch panel 50. FIG. 9A shows a state of the display on the touch panel 50 before the user has pressed the first scroll button 120. When the first scroll button 120 is pressed or selected, as shown in FIG. 9B, one of the titles 106 displayed on the large area (i.e., a title A) is moved to the small area while one of the titles 106 displayed on the small area (i.e., a title B) is moved to the large area. Where the CPU 14 has judged that the user has pressed the first scroll button 120 (S14: YES), the processing goes to S16. Where the CPU 14 has judged that the user has not pressed the first scroll button 120 (S14: NO), the processing goes to S15.

Figure 7:
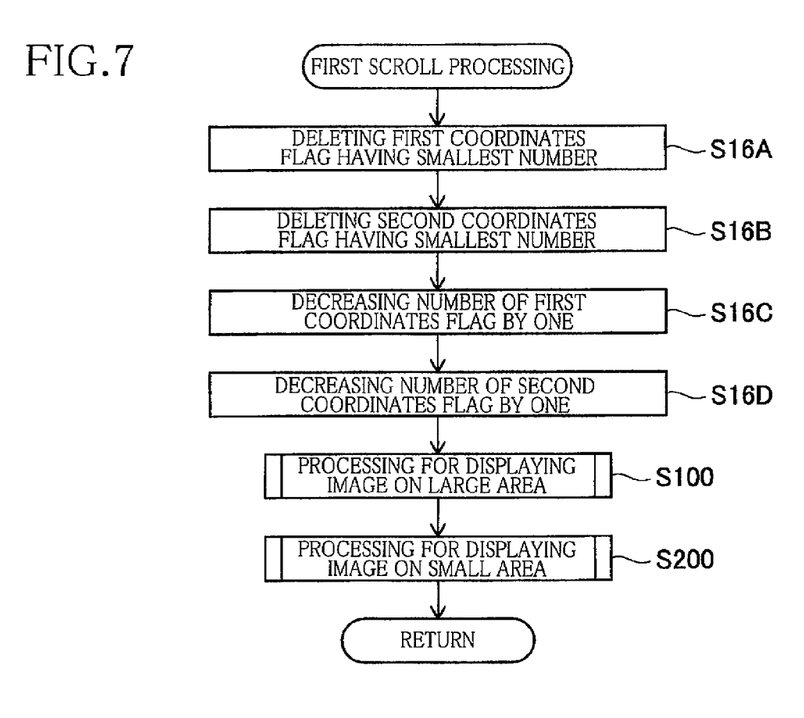
FIG. 7 is a flow-chart showing a first scroll processing.

There will be explained a first scroll processing of S16 with reference to FIG. 7.

In S16A, the CPU 14 deletes, from the basic-function work area 32, (a) the title 106 to which is attached the first coordinates flag having the smallest number among the titles 106 displayed on the large area and (b) information relating thereto. In this time, the CPU 14 also deletes the first coordinates flag attached to the original title 106 based on which the deleted title 106 is produced and which is stored in the content storage area 37.

In S16B, the CPU 14 deletes, from the basic-function work area 32, (a) the title 106 to which is attached the second coordinates flag having the smallest number among the titles 106 displayed on the small area and (b) information relating thereto. In this time, the CPU 14 also deletes the second coordinates flag attached to the original title 106 based on which the deleted title 106 is produced and which is stored in the content storage area 37. Further, the priority flag is attached to the original title 106 based on which the deleted title 106 is produced. The priority flag is a kind of flag which is attached to the title 106 to be selected by the CPU 14 prior to other titles 106 upon performing the processing of S101 where there is any title 106 to be selected prior to other titles 106. Where the processing of S100 is performed in S16, a plurality of the titles 106 to each of which any of the first coordinates flag and the second coordinates flag is not attached exist in the content storage area 37 upon the processing of the S101. The priority flag is attached for reliably displaying, on the large area, the title 106 displayed on the small area and the information relating thereto.

In S16C, the CPU 14 decreases the number of the first coordinates flag attached to each title 106 displayed on the large area by one. In this time, the CPU 14 also decreases by one the number of the first coordinates flag attached to the original title 106 based on which each displayed title 106 is produced.

In S16D, the CPU 14 decreases the number of the second coordinates flag attached to each title 106 displayed on the small area by one. In this time, the CPU 14 also decreases by one the number of the second coordinates flag attached to the original title 106 based on which each displayed title 106 is produced. Then, the CPU 14 performs the processing of S100 for the title(s) 106 stored in the content storage area 37 and information relating thereto, and then performs the processing of S200 in the same manner.

The explanation of the main processing is continued with reference to FIG. 3 again. In S15, the CPU 14 judges whether the user has pressed a second scroll button 122 or not. As shown in FIGS. 9A, 9B, and 9C, the second scroll button 122 is a button for scrolling the title(s) 106 displayed on the touch panel 50. Where the user has selected the second scroll button 122 in a state shown in FIG. 9A in which the use has not pressed the second scroll button 122 yet, as shown in FIG. 9C, one of the titles 106 displayed on the large area (i.e., a title E) is moved to the small area while one of the titles 106 displayed on the small area (i.e., the title B) is moved to the large area. Where the CPU 14 has judged that the user has pressed the second scroll button 122 (S15: YES), the processing goes to S17. Where the CPU 14 has judged that the user has not pressed the second scroll button 122 (S15: NO), the processing goes to S14.

Figure 8:
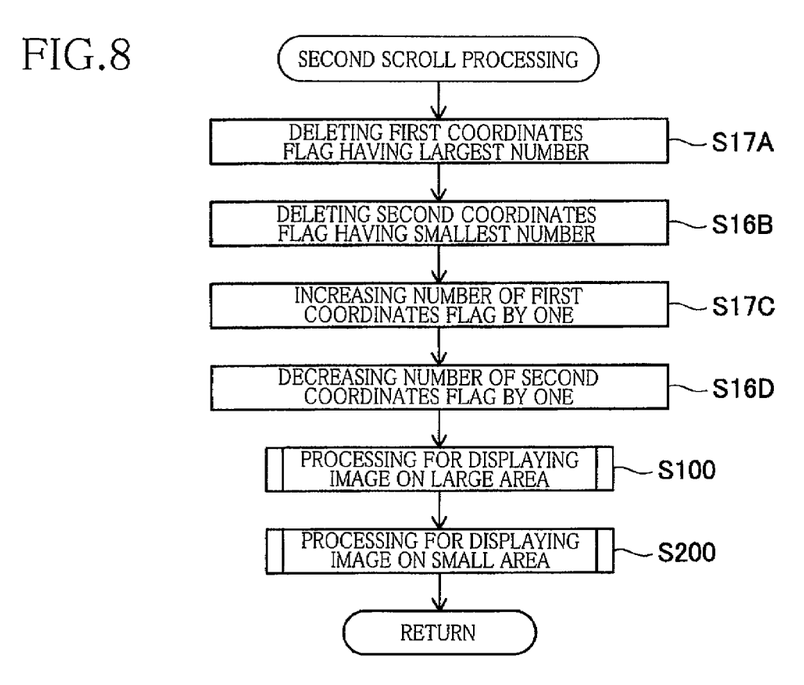
FIG. 8 is a flow-chart showing a second scroll processing.

There will be explained a second scroll processing of S17 with reference to FIG. 8. In S17A, the CPU 14 deletes, from the basic-function work area 32, the title 106 to which is attached the first coordinates flag having the largest number among the title(s) 106 displayed on the large area. In this time, the CPU 14 also deletes the first coordinates flag attached to the original title 106 which is stored in the content storage area 37 and based on which the deleted title 106 is produced.

In S16B, the CPU 14 deletes, from the basic-function work area 32, the title 106 to which is attached the second coordinates flag having the smallest number among the title(s) 106 displayed on the small area. In this time, the CPU 14 also deletes the second coordinates flag attached to the original title 106 which is stored in the content storage area 37 and based on which the deleted title 106 is produced. Further, the CPU 14 attaches the priority flag to the original title 106 based on which the deleted title 106 is produced.

In S17C, the CPU 14 increases the number of the first coordinates flag attached to each title 106 displayed on the large area by one. In this time, the CPU 14 also increases by one the number of the first coordinates flag attached to the original title 106 based on which each displayed title 106 is produced.

In S16D, the CPU 14 decreases the number of the second coordinates flag attached to each title 106 displayed on the small area by one. In this time, the CPU 14 also decreases by one the number of the second coordinates flag attached to the original title 106 based on which each displayed title 106 is produced. Then, the CPU 14 performs the processing of S100 for various informations stored in the content storage area 37, and then performs the processing of S200 for the various informations.

In view of the above, the CPU 14 can be considered to include a feed information obtaining section which obtains, from the content distribution servers 90, 91, the feed information 101 including the content informations 150, which stores the obtained feed information 101 into the feed-information-analysis work area 34 and which performs the processings of S1 and S2. Further, the CPU 14 can be considered to include an image data obtaining section which obtains the image data 110 on the basis of the image URL 108 included in the feed information 101 obtained by the feed information obtaining section, and which performs the processing of S3. Further, the CPU 14 can be considered to include a display controller which displays the image data 110 obtained on the basis of the image URL 108 on the touch panel 50 in association with the content URL 107 included in the content information 150 including the image URL 108 and which performs the processings of S100 and S200. Further, the CPU 14 can be considered to include an obtainment judging section which judges whether the image data 110 has been obtained on the basis of the image URL 108 by the image data obtaining section or not. Further, the CPU 14 can be considered to include a display judging section that judges whether there is any area of the large area on which the image data 110 is displayable or not after the image data 110 based on the respective image URLs of all the content informations has been displayed on the large area, and that performs the processing of S11. Further, the CPU 14 can be considered to include a movement display section which displays the image data 110 displayed on the touch panel 50 such that the image data 110 is moved from one to the other of the large area and the small area, which displays the alternative image data such that the alternative image data is moved from the other to the one of the large area and the small area, and which performs the processing of S16 and S17.

There will be next explained effects of the present embodiment.

According to the present embodiment, where all the titles 106 and the image data 110 cannot be displayed on the large area, the CPU 14 calculates the number of the titles 106 which cannot be displayed on the large area and displays the titles 106 on the small area which has the smaller display area than the large area. In this time, the CPU 14 changes the display size of each title 106 and displays each title 106 on the touch panel 50 in association with the content URL 107, thereby making it possible to display all the titles 106 on the touch panel 50. Thus, the user can view or browse the content informations 150 at a time.

Further, where there is no image data 110 linked from the image URL 108 included in the obtained content information 150, the alternative image data stored in the basic-function-parameter storage area 42 can be displayed on the touch panel 50 instead of the image data 110. Also in this case, on the large area, the CPU 14 displays, with a higher priority, the title 106 included in each content information 150 whose image data 110 has been obtained. As a result, this communication apparatus 10 achieves a high browsability for the user. Further, the display size of each title 106 displayed on the small area is changed in accordance with the number of the content informations 150. Thus, there can be prevented that the display area of the touch panel 50 is uselessly used, and the CPU 14 can display the titles 106 and informations relating thereto as many as possible. Accordingly, the browsability for the user is improved. Further, since only the title(s) 106 which cannot be displayed on the large area is changed to the smaller size, the CPU 14 can display a relatively large number of the content informations 150 while keeping an original display state as much as possible. Further, the display area of the touch panel 50 is divided into the large area and the small area, thereby achieving a display state in which the user can easily browse or view the content informations 150. Further, where the alternative image data is stored, each title 106 displayed on the small area can be given a commonality by displaying the title 106 and the alternative image data on the small area so as to overlap with each other. It should be understood that the title(s) 106 is or are displayed even where the alternative image data is not stored.

Further, where the display sizes of the alternative image data vary with the display areas, when the displayed title 106 is moved from one of the small area and the large area to the other, the alternative image data is replicated in an appropriate size in each display area, thereby improving the browsability for the user.

Further, all the plurality of the alternative image data can be collectively displayed one of the large area and the small area. Since the content information 150 whose image data 110 has not been obtained and the content information 150 whose image data 110 has been obtained are displayed so as to be distinguished from each other, a relatively high browsability for the user is achieved.

Since the title 106 and alternative image data are displayed on the touch panel 50 so as to overlap with each other, the user can easily judge which content information 150 the produced alternative image data corresponds to.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

The technological components described in the present specification or the drawings exhibit technological utility individually or in various combinations, and are not limited to the combinations disclosed in the claims at the time of application. Furthermore, the technology illustrated in the present specification or the drawings may simultaneously achieve a plurality of objects, and has technological utility by achieving one of these objects.

What is claimed is:

1. A communication apparatus which obtains a content on the basis of a content URL associated with image data displayed on a display portion where the image data has been selected, the communication apparatus comprising:
    a feed information obtaining section configured to obtain, from a server device, feed information including a plurality of content informations each including a title of the content, an image URL indicating positional information of the image data, and the content URL indicating positional information of the content and configured to store the obtained feed information into a storage device;
    an image data obtaining section configured to obtain the image data on the basis of the image URL included in the feed information obtained by the feed information obtaining section;
    a display controller configured to display the image data obtained on the basis of the image URL on the display portion in association with the content URL included in the content information including the image URL;
    an obtainment judging section configured to judge whether the image data has been obtained on the basis of the image URL by the image data obtaining section or not,
    wherein the display controller is configured to display, where the obtainment judging section has judged that the image data has not been obtained on the basis of the image URL, alternative image data instead of the image data on the display portion in association with the content URL included in the content information including the image URL.

2. The communication apparatus according to claim 1, wherein the alternative image data is stored in the storage device and is based on template image data which is a template displayable on the display portion.

3. The communication apparatus according to claim 1, wherein the display portion includes (a) a large display area on which the image data is displayed and (b) a small display area disposed at a position different from a position at which the large display area is disposed, wherein the image data is displayed on the small display area in a smaller size than on the large display area,
wherein the display controller is configured to display, on the large display area, the image data based on the image URL of the content information for which the obtainment judging section has judged that the image data has been obtained, and
wherein the display controller is configured to display, on the small display area, the alternative image data associated with the content URL of the content information for which the obtainment judging section has judged that the image data has not been obtained.

4. The communication apparatus according to claim 3, wherein the display controller includes a display judging section configured to judge whether there is any area of the large display area on which the image data is displayable or not after the image data based on the respective image URLs of all the content informations has been displayed on the large display area, and
wherein the display controller is configured to display, where the display judging section has judged that there is any area of the large display area on which the image data is displayable, the alternative image data on the large display area, the alternative image data being associated with the content URL of the content information for which the obtainment judging section has judged that the image data has not been obtained.

5. The communication apparatus according to claim 3, wherein the display controller is configured to display, where there is any image data that is based on the image URL of the content information for which the obtainment judging section has judged that the image data has been obtained and that is not displayable on the large display, the image data on the small display area.

6. The communication apparatus according to claim 1, wherein the display controller is configured to simultaneously display the image data respectively based on the plurality of image URLs included in the feed information, on the display portion in predetermined order, and
wherein the display controller is configured to display, where the plurality of content informations included in the obtained feed information include the content information whose image data has been obtained and the content information whose image data has not been obtained as a result of the judgment of the obtainment judging section, the image data of the content information which is image data to be displayed just after the image data having not been obtained and which has been obtained, on a display area of the display portion on which the image data having not been obtained is to be displayed.

7. The communication apparatus according to claim 1, wherein the display controller is configured to assign numbers respectively to the plurality of content informations included in the feed information in order from the content information which has been described first.

8. The communication apparatus according to claim 7, wherein the display portion includes a plurality of display areas on each of which the image data or the alternative image data is displayed,
wherein one of the plurality of display areas includes a plurality of image display areas on each of which the image data or the alternative image data is displayed,
wherein the display controller is configured to compare the number of the content informations included in the feed information obtained by the feed information obtaining section and the number of the image display areas of the one display area, and
wherein the display controller is configured to display, where the number of the content informations is equal to or smaller than the number of the image display areas, one of the image data based on the image URL of the content information and the alternative image data associated with the content URL of the content information, on the plurality of image display areas of the one display area in order of the numbers respectively assigned to the plurality of content informations.

9. The communication apparatus according to claim 1, wherein the display portion includes a plurality of display areas on each of which the image data or the alternative image data is displayed,
wherein the display controller is configured to display, on one of the plurality of display areas, the image data based on the image URL of the content information for which the obtainment judging section has judged that the image data has been obtained,
wherein the display controller is configured to display, on another of the plurality of display areas, the alternative image data associated with the content information for which the obtainment judging section has judged that the image data has not been obtained, and
wherein the display controller includes a movement display section configured to display the image data displayed on the display portion such that the image data is moved from the one display area to said other display area in the display area and configured to display the alternative image data such that the alternative image data is moved from said other display area to the one display area.

10. The communication apparatus according to claim 9, wherein the movement display section is configured to change a size of the image data on the basis of a display size of said other display area and to display the image data whose size has been changed, where the image data is displayed so as to be moved from the one display area to said other display area, and
wherein the movement display section is configured to change a size of the alternative image data on the basis of a display size of the one display area and to display the alternative image data whose size has been changed, where the alternative image data is displayed so as to be moved from said other display area to the one display area.

11. The communication apparatus according to claim 1, wherein the display portion includes a plurality of display areas on each of which the image data or the alternative image data is displayed,
wherein the display controller is configured to display, on one of the plurality of display areas, the image data based on the image URL of the content information for which the obtainment judging section has judged that the image data has been obtained, and
wherein the display controller is configured to display, on another of the plurality of display areas, all the plurality of the alternative image data associated with the content information for which the obtainment judging section has judged that the image data has not been obtained.

12. The communication apparatus according to claim 11, wherein the display controller is configured to determine the number of specific image data to be displayed on said other display area among the image data and the alternative image data, and
wherein the display controller is configured to determine a size of the specific image data displayed on said other display area and a display position of the specific image data in said other display area on the basis of the determined number of the specific image data and to display the specific image data on said other display area.

13. The communication apparatus according to claim 1, wherein the display controller is configured to display the title of the content included in the content information and the alternative image data such that the title and the alternative image data overlap with each other.

14. The communication apparatus according to claim 13, wherein the display controller is configured to display, on the display portion, both of the title of the content included in the content information and the alternative image data displayed so as to overlap with the title, in association with the content URL included in the content information.

15. A storage medium storing a program executed by a communication apparatus which obtains a content on the basis of a content URL associated with image data displayed on a display portion where the image data has been selected, the program comprising:
obtaining, from a server device, feed information including a plurality of content informations each including the title of the content, an image URL indicating positional information of the image data associated with the title, and a content URL indicating positional information of the content and storing the obtained feed information into a storage device;
obtaining the image data on the basis of the image URL included in the obtained feed information;
displaying the obtained image data on the display portion in association with the content URL included in the content information including the image URL;
judging whether the image data has been obtained on the basis of the image URL or not; and
displaying, where the image data has not been obtained on the basis of the image URL, alternative image data instead of the image data on the display portion in association with the content URL included in the content information including the image URL.

* * * * *